United States Patent [19]

Hayashi et al.

[11] Patent Number: 5,359,435
[45] Date of Patent: Oct. 25, 1994

[54] FACSIMILE APPARATUS

[75] Inventors: Toshiyuki Hayashi; Takeshi Ikeda, both of Yokohama; Toshiyuki Takano, Kawasaki; Hiroshi Ogushi, Shiroi, all of Japan

[73] Assignee: Canon Kabushiki Kaisha, Tokyo, Japan

[21] Appl. No.: 934,328

[22] Filed: Aug. 25, 1992

[30] Foreign Application Priority Data

Aug. 30, 1991 [JP] Japan .................. 3-219830
Nov. 28, 1991 [JP] Japan .................. 3-314567

[51] Int. Cl.⁵ ............................................ H04H 1/04
[52] U.S. Cl. ................................ 358/498; 358/496; 358/296; 355/308; 355/318; 355/321; 271/9; 271/3
[58] Field of Search ............. 358/498, 496, 493, 296, 358/471, 474, 473, 400, 401; 355/318, 321, 260, 308, 309; 271/9, 3

[56] References Cited

U.S. PATENT DOCUMENTS

| | | | |
|---|---|---|---|
| 4,607,291 | 8/1986 | Oono | 358/498 |
| 4,608,714 | 8/1986 | Juengel | 340/636 |
| 4,743,976 | 5/1988 | Katakabe et al. | 358/296 |
| 4,969,048 | 11/1990 | Hoshimo | 358/296 |
| 5,001,516 | 3/1991 | Maruyama et al. | 358/296 |
| 5,025,326 | 6/1991 | Shimmyo | 358/498 |
| 5,077,618 | 12/1991 | Sakai et al. | 358/498 |
| 5,083,170 | 1/1992 | Sawada et al. | 355/318 |
| 5,138,463 | 8/1992 | Morimoto et al. | 358/496 |
| 5,218,446 | 6/1993 | Sobue | 358/296 |
| 5,231,505 | 7/1993 | Watanabe et al. | 358/296 |

FOREIGN PATENT DOCUMENTS 0447264 9/1991 European Pat. Off. .

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A facsimile apparatus, which includes a recording unit adopting serial recording type ink-jet recording means, and which can arbitrarily supply one recording sheet to the recording unit without warping (curling) a recording sheet, and has an optimal arrangement capable of decreasing the installation area, includes a main body forming the outer surface of the facsimile apparatus, the recording unit arranged in the main body; an original reader arranged in an upper portion of the main body; an original insertion port for an original, which port is formed in the upper surface of the main body; a sheet insertion port for a recording sheet, which port is formed in the upper surface of the main body; an original discharge port for the original, which port is formed in the front surface of the main body; a sheet discharge port for the recording sheet, which port is formed in the front surface of the main body; an original convey path for conveying the original from the original insertion port to the original discharge port through the original reader; and a recording sheet convey path for conveying the recording sheet from the sheet insertion port to the sheet discharge port through the recording unit.

18 Claims, 4 Drawing Sheets

FACSIMILE APPARATUS

BACKGROUND OF THE INVENTION

In general, a facsimile apparatus is often used in an unattended state such as in the night, and high recording quality, easy maintenance, and low recording cost are required due to a large recording amount.

For this reason, a facsimile apparatus normally uses roll paper as recording paper, and normally adopts a thermal recording system as a recording system.

However, since recent ink-jet recording techniques have remarkably advanced, and recording quality has become very high, some facsimile apparatuses employ a serial ink-jet recording system.

1. FIELD OF THE INVENTION

The present invention relates to a facsimile apparatus which uses a cut paper sheet as recording paper, and adopts serial ink-jet recording means as a recording system.

2. DESCRIPTION OF THE RELATED ART

A conventional facsimile apparatus comprising a serial recording type ink-jet recording means has an arrangement, as shown in FIG. 4. As shown in FIG. 4, an operation panel 51 is arranged on the front edge portion of the upper surface of a main body 50. Below the operation panel 51, an original reader is arranged. The original reader moves an original E fed from an original table 52 in a direction of an arrow A, and reads the original while discharging the original E onto a tray 54 through an opening portion 53 formed in the front side surface of the main body 50. The original reader is constituted by a contact sensor 55 which is brought into direct contact with the original surface of the original E to read an original image, a feed roller 56, and the like.

A serial recording type ink-jet recording apparatus is incorporated below and behind the original reader. The ink-jet recording apparatus is constituted by a carriage 57, which is reciprocally driven by a drive mechanism (not shown) in the upper/lower direction of the sheet surface, and an ink cartridge 58 (indicated by a broken line) detachably attached to the carriage 57. The ink-jet recording apparatus performs recording onto a recording sheet S which is fed in a direction of an arrow B.

A plurality of recording sheets S are stacked and stored in a sheet base 59, and are conveyed one by one to a position between a main roller 60 and a sheet guide 61 by a sheet separation mechanism (not shown). The recording sheet is then conveyed step by step in the direction of the arrow B, and is subjected to recording for one line corresponding to a predetermined number of dots. Upon completion of recording for one sheet, the recording sheet is discharged onto a tray 62.

SUMMARY OF THE INVENTION

However, in the conventional ink-jet recording apparatus, the recording sheet S is wound on a substantially half portion of the outer circumferential surface of the main roller 60, and its direction is then reversed to be fed toward the tray 62. For this reason, when a relatively thick recording sheet S having high stiffness is to be conveyed, the load on a paper drive mechanism is increased. As a result, a predetermined step-convey operation is disabled, a regular recording result cannot be obtained, and the sheet warps (curls) when its direction is reversed. In addition, one recording sheet cannot be arbitrarily fed to the ink-jet recording apparatus.

Since a sheet cartridge storing recording sheets is arranged parallel to an installation floor surface, the installation area is undesirably increased. In this manner, the conventional facsimile apparatus, which uses a cut sheet as a recording sheet, and adopts the serial recording type ink-jet recording means, does not have an optimal arrangement.

Therefore, the present invention has been made in consideration of the above-mentioned problems, and has as its object to provide a facsimile apparatus, which can arbitrarily supply one recording sheet to an ink-jet recording apparatus without increasing the load on a paper drive mechanism even when a relatively thick recording sheet S is conveyed, is free from a warp or curl of the recording sheet, and can decrease the installation area. It is another object of the present invention to provide a facsimile apparatus having an optimal arrangement, which can convey a recording sheet and an original by utilizing their weights, and can decrease the installation area.

In addition to the above-mentioned objects, it is still another object of the present invention to provide a facsimile apparatus, which can process a large-size original even when the installation area is decreased.

In addition to the above-mentioned objects, it is still another object of the present invention to provide a facsimile apparatus, which allows easy replacement of an ink cartridge.

In order to achieve the above objects, according to the present invention, a facsimile apparatus comprises a main body forming an outer surface of the facsimile apparatus, a recording unit, which adopts serial recording type ink-jet recording means, and being arranged in the main body, an original reader arranged in an upper portion of the main body, an original insertion port for an original, which port is formed in an upper surface of the main body, a sheet insertion port for a recording sheet, which port is formed in the upper surface of the main body, an original discharge port for the original, which port is formed in a front surface of the main body, a sheet discharge port for the recording sheet, which port is formed in the front surface of the main body, an original convey path for conveying the original from the original insertion port to the original discharge port through the original reader, and a recording sheet convey path for conveying the recording sheet from the sheet insertion port to the sheet discharge port through the recording unit. The recording unit, the original reader, the original insertion and discharge ports for an original, the sheet insertion and discharge ports for a recording sheet, the original convey path, and the recording sheet convey path are appropriately arranged at predetermined positions in the main body so as to decrease the installation area of the apparatus, and the original convey path and the recording sheet convey path are rendered compact and simple by effectively utilizing the weights of the sheet and the original.

Preferably, a facsimile apparatus comprises a main body forming an outer surface of the facsimile apparatus, a recording unit, which adopts serial recording type ink-jet recording means, and being arranged in the main body, an original reader arranged in an upper portion of the main body, an original insertion port for an original, which port is formed in an upper surface of the main body, a sheet insertion port for a recording sheet, which port is formed in the upper surface of the main body, an original discharge port for the original, which port is formed in a front surface of the main body, a sheet discharge port for the recording sheet, which port is formed in the front surface of the main body, an original convey path for conveying the original from the original insertion port to the original discharge port through the original reader, a recording sheet convey path for conveying the recording sheet from the sheet insertion port to the sheet discharge port through the recording unit, a portion of the recording sheet convey path being inclined from the upper surface toward the front surface of the main body, and a lid, one end of which is axially supported and which is located at an intermediate portion of the recording sheet convey path, the lid closing between the sheet insertion port and the original insertion port, and particularly supporting a portion of a large-size original when the lid is set in an upright state.

Preferably, a facsimile apparatus comprises a main body forming an outer surface of the facsimile apparatus, a recording unit, which constitutes by providing a replaceable ink cartridge to serial recording type ink-jet recording means, and being arranged in a portion behind a front surface of the main body, a front surface lid, which is openably arranged on the front surface of the main body, and allows replacement of the ink cartridge, an original reader arranged in an upper portion of the main body, an original insertion port for an original, which port is formed in an upper surface of the main body, a sheet insertion port for a recording sheet, which port is formed in the upper surface of the main body, an original discharge port for the original, which port is formed in the front surface of the main body, a sheet discharge port for the recording sheet, which port is formed in the front surface of the main body, an original convey path for conveying the original from the original insertion port to the original discharge port through the original reader, and a recording sheet convey path for conveying the recording sheet from the sheet insertion port to the sheet discharge port through the recording unit. The recording unit, the original reader, the original insertion and discharge ports for an original, the sheet insertion and discharge ports for a recording sheet, the original convey path, and the recording sheet convey path are appropriately arranged at predetermined positions in the main body so as to decrease the installation area of the apparatus, and the original convey path and the recording sheet convey path are rendered compact and simple by effectively utilizing the weights of the sheet and the original. In addition, the ink cartridge can be easily exchanged.

Other features and advantages of the present invention will be apparent from the following description taken in conjunction with the accompanying drawings, in which like reference characters designate the same or similar parts throughout the figures thereof.

Note that the present invention is not limited to its embodiment, and various changes and modifications may be made within the scope of the appended claims.

DESCRIPTION OF THE PREFERRED EMBODIMENT

Figure 1:
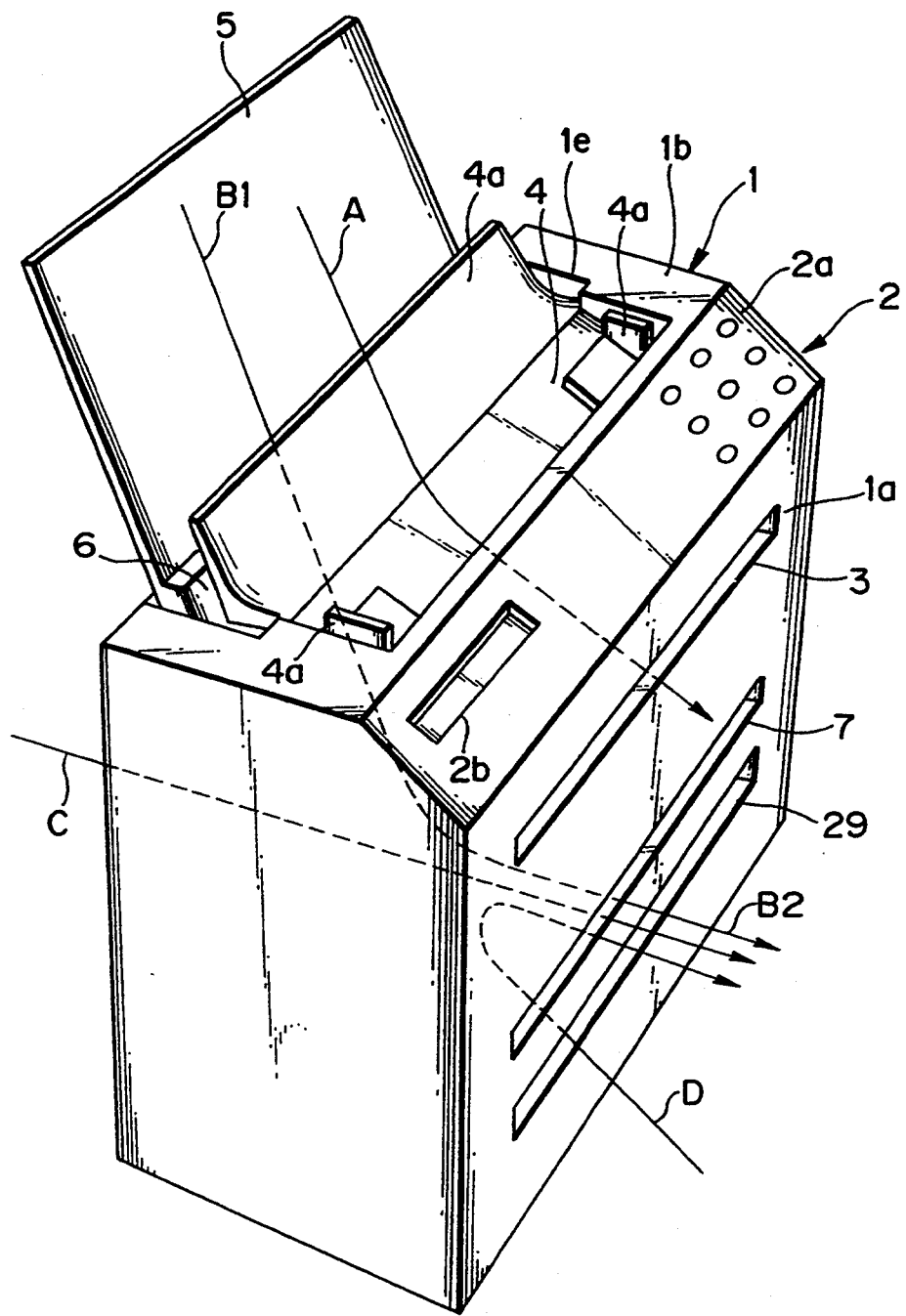
FIG. 1 is a perspective view showing the outer appearance of a facsimile apparatus according to an embodiment of the present invention.

An embodiment of the present invention will be described in detail hereinafter with reference to the accompanying drawings. FIG. 1 is a perspective view showing the outer appearance of a facsimile apparatus according to an embodiment of the present invention. In FIG. 1, a main body 1 of the facsimile apparatus is a facsimile apparatus comprising a serial recording type ink-jet recording means (to be described later).

This facsimile apparatus is placed in an upright state on the desk. In order to assure operability, an operation panel 2 is provided to the front edge portion of an upper surface 1b of the main body 1. An original E and a recording sheet S as a cut sheet are inserted from an upper opening portion 1e of the apparatus, and are discharged from the front surface side of the apparatus.

Keys 2a and a display 2b are arranged on the operation panel 2. An original table 4 having an openable lid portion 4b is arranged below and behind the operation panel 2, and stocks a plurality of originals thereon. At this time, the area necessary for stocking the originals cannot be fully assured by the original table 4 and the lid portion 4b, and is assured by also utilizing a recording sheet tray 5. More specifically, the recording sheet tray 5 also serves as an original table. An original reader (to be described later) is arranged below the operation panel 2. The original reader registers originals in their widthwise direction by a guide 4a, moves the originals one by one in a direction of an arrow, and reads an original image while discharging the original to an opening portion 3 formed in a front side surface 1a of the main body 1.

A serial recording type ink-jet recording apparatus is arranged below the original reader. A sheet base 6 for supplying recording sheets S is obliquely attached to the main body 1 or is constructed detachable from the main body 1. The recording sheet S fed one by one from the sheet base 6 in a direction of an arrow B1 is fed to the ink-jet recording apparatus, and is discharged from a discharge port 7 formed in the front surface 1a of the main body 1 in a direction of an arrow B2 after the recording operation of the ink-jet recording apparatus. The ink-jet recording apparatus also performs recording on a sheet fed on a direction of an arrow C and D in FIG. 1.

Figure 2:
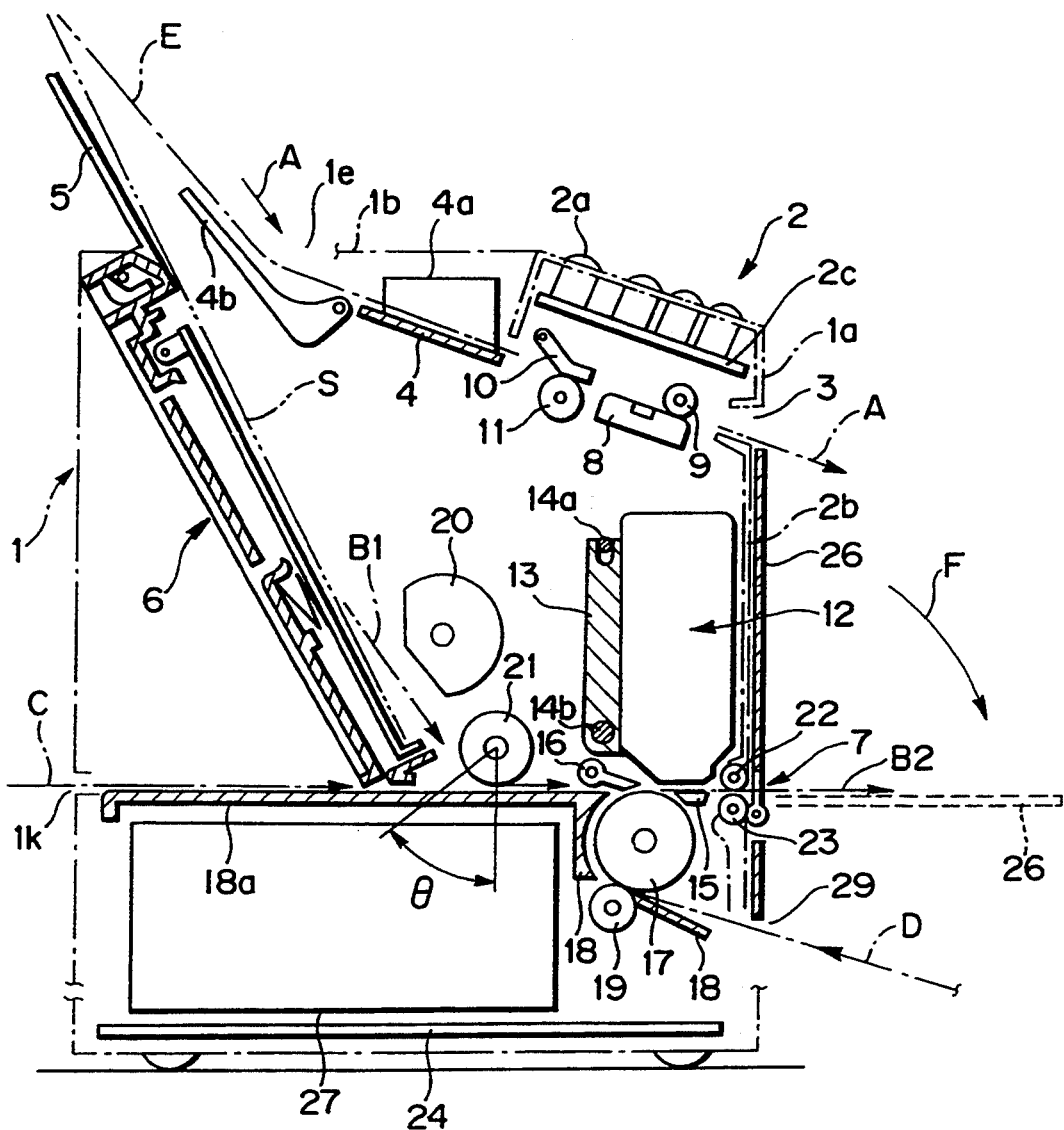
FIG. 2 is a sectional view taken along a line X—X in FIG. 1.

FIG. 2 is a sectional view taken along a line X—X in FIG. 1, and shows principal constituting elements to be incorporated. In FIG. 2, the operation panel 2 is arranged on the front edge portion of the upper surface 1b of the main body 1 indicated by an alternate long and short dashed line in FIG. 2, and is provided with the keys 2a mounted on a circuit board 2c, and the display 2b, which are exposed externally from hole portions integrally formed in the operation panel 2.

The original reader for moving the original E indicated by an alternate long and short dashed line in FIG. 2 in the direction of the arrow A, and reading an original image while discharging the original E to the opening portion 3 formed in the front side surface 1a of the main body 1 is arranged to the left and below the operation panel 2.

The original reader is constituted by a contact sensor 8, which is brought into direct contact with the original surface of the original E to read an original image, and a feed roller 9 which is pivotally pressed against a reading unit of the contact sensor 8. In order to feed a plurality of originals stacked on the original table 4 one by one toward the contact sensor 8, a separation piece 10 and a separation feed roller 11 are arranged at the upstream side of the contact sensor 8.

In the serial recording type ink-jet recording apparatus, as shown in FIG. 2, a carriage 13 is arranged in a substantially upright state, so that an ink-jet recording unit faces down. Thus, the recording sheet S fed one by one from the sheet base 6 in the direction of the arrow B1 can be prevented from being forcibly deformed. When a sheet cartridge is arranged in place of the sheet base 6, it may be arranged to be detachable in the direction of the arrow C in FIG. 2, thus further eliminating deformation when the sheet is conveyed.

The ink-jet recording apparatus suitably adopts a bubble ink-jet recording apparatus as the inherent technique of the present applicant, but may adopt other known ink-jet recording apparatuses. The ink-jet recording apparatus comprises a recording scan section for scanning to perform recording in the widthwise direction of the sheet. The recording scan section comprises the carriage 13 which is slidably guided by guide shafts 14a and 14b so as to be reciprocally driven by a drive mechanism (not shown) in the upper/lower direction of the sheet surface, an ink cartridge 12 replaceably attached to the carriage 13, and a platen 15 fixed to the main body, and serving as a stationary table for the recording sheet in a recording mode.

The ink-jet recording apparatus also comprises a sheet feed section. The sheet feed section comprises a rubber roller 17 driven by a drive unit (not shown) provided to the main body, a pressing piece 16, a sheet guide 18, a roller 22, which does not adversely influence recording upon being in contact with an insufficiently dried recording surface after an ink-jet recording operation, and a driving roller 23. The ink-jet recording apparatus performs recording onto the recording sheet S fed from the direction of the arrow B1, and discharges the recording sheet in the direction of the arrow B2.

The roller 22 is pivotally arranged at the edge portion of a plate 2b. The plate 2b is supported by the main body 1 to be pivotal and openable. After the plate 2b is opened, the ink cartridge 12 can be easily replaced, and a jammed sheet can also be easily removed. In addition, the lid 26 is pivoted in a direction of an arrow F, and is held at a position indicated by a broken line in FIG. 2. The recording sheet discharged in the direction of the arrow B2 can be placed on the lid 26.

A driven roller 19 is pressed against the outer circumferential surface of the above-mentioned rubber roller 17. One recording sheet inserted in a direction of an arrow D from an opening portion 29 is guided along the sheet guide 18 to be fed to the platen 15, thus allowing recording.

A plurality of recording sheets S are stacked on the sheet base 6, and are fed one by one to a position between the pressing piece 16 and the rubber roller 17 by a separation feed roller 20 as a sheet separation mechanism, and a feed roller 21.

The recording sheet S is subjected to bending deformation corresponding to an angle by the feed roller 21. However, since the angle is considerably smaller than 180° corresponding to half the entire circumference, the adverse influence on the recording sheet S can be eliminated.

Furthermore, a rear surface opening portion 1k is formed in the rear surface of the main body 1. Using this opening portion, the recording sheet can be almost horizontally supplied.

In the above-mentioned facsimile apparatus, a plurality of recording sheets S are stocked on the sheet base 6, and the sheet base 6 is attached to the main body 1. A plurality of original E are stocked on the original table 4. In this case, the originals E are stocked by utilizing not only the lid portion 4b but also the tray 5 as an original tray. In a transmission mode, the original E is fed in the direction of the arrow A, and transmission is performed. In a reception mode, the separation feed roller 20, and the like are driven to feed one recording sheet to a position between a guide portion 18a of the sheet guide 18 and the feed roller 21. After the sheet is clamped between the guide portion 18a and the feed roller 21, it is fed to a position between the pressing piece 16 for changing feed direction and the rubber roller 17.

Thereafter, the sheet is conveyed step by step in the direction of the arrow B2 to record one line corresponding to a predetermined number of dots. Upon completion of recording for one sheet, the sheet is discharged through the discharge port 7 outside the apparatus.

Figure 3:
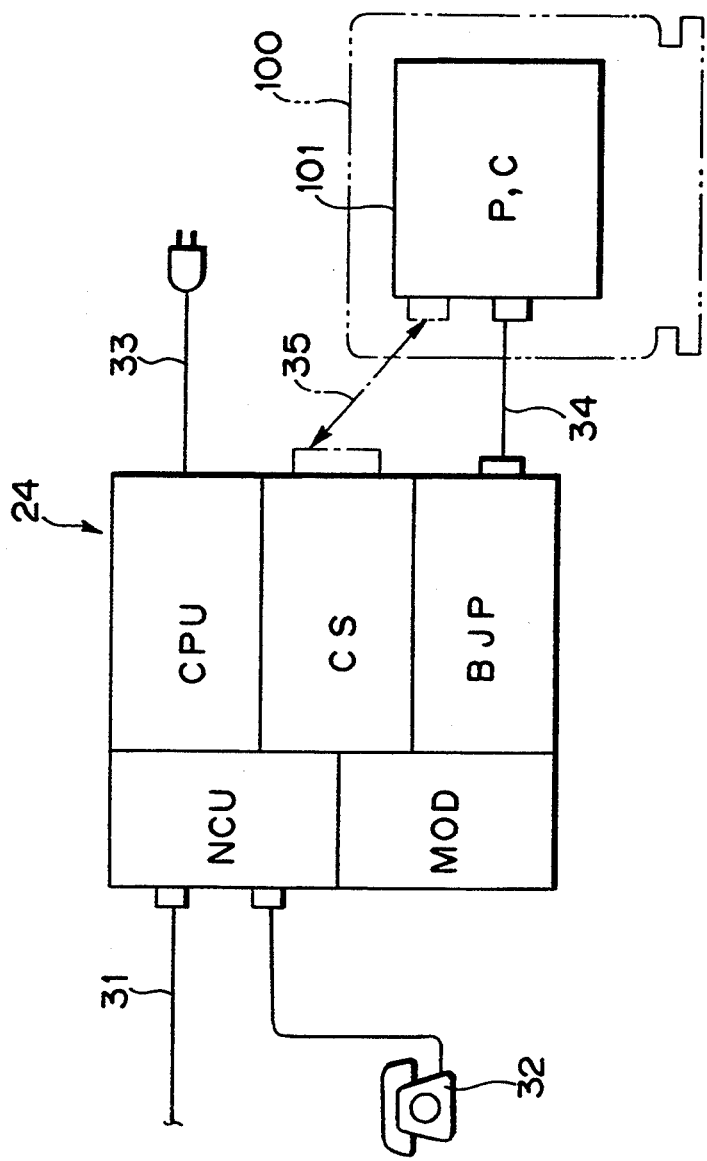
FIG. 3 is a block diagram of the facsimile apparatus shown in FIG. 1.
Figure 4:
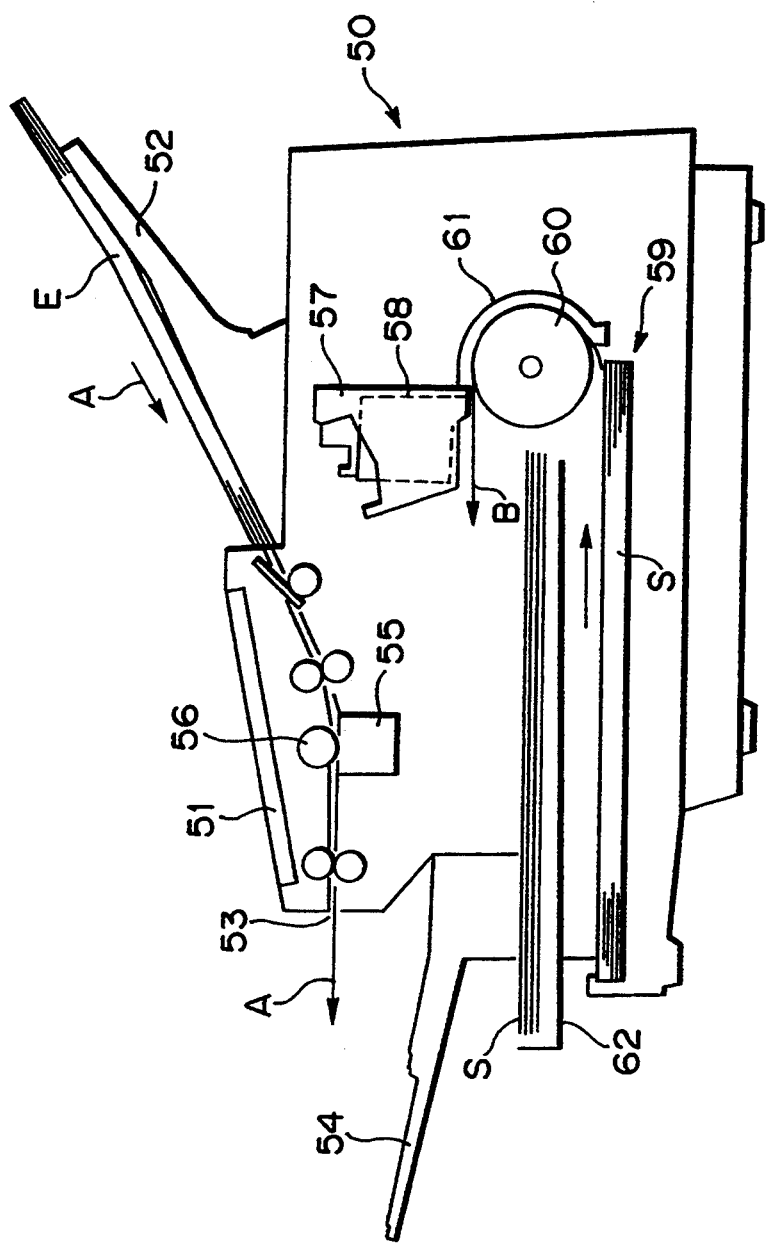
FIG. 4 is a sectional view of principal part of a conventional facsimile apparatus.

FIG. 3 is a block diagram of a circuit incorporated in the main body, and illustrates functional blocks mounted on a control board 24 (FIG. 2). A network control unit NCU connected to a line 31 is connected to a telephone set 32, and automatically discriminates a facsimile reception mode or a telephone reception mode. The network control unit NCU is connected to a modem MOD, and exchanges predetermined signals with a main control unit CPU. The main control unit CPU is connected to the contact sensor CS (8) and an ink-jet recording unit BJP so as to read an original image and to record image data. The ink-jet recording unit BJP is directly connected to a main board 101 of a personal computer 100 through a signal line 34, so that the unit BJP can be independently used as an output terminal of the personal computer. When the ink-jet recording unit BJP is used as the output terminal of the personal computer, it is convenient to insert recording sheets one by one, as described above, since various forms can be arbitrarily set.

As indicated by a broken line in FIG. 3, a signal line 35 may be directly connected to the contact sensor CS (8), and the sensor may be used for reading an image.

In the above-mentioned arrangement, since a space portion is conveniently formed in the bottom portion of the main body 1, the board 24 is arranged along the bottom surface, as shown in FIG. 2, and a power supply unit 27 is arranged below the guide portion 18a of the sheet guide 18 to set the center of gravity at a lower position.

As described above, according to the present invention, even when a relatively thick recording sheet S is conveyed, one recording sheet can be arbitrarily supplied to the ink-jet recording apparatus without increasing the load on the paper drive mechanism. In addition, the sheet can be prevented from warping or curling, and the installation area can be decreased.

Since the recording sheet and the original are conveyed by effectively utilizing their weights, the facsimile apparatus which has a very simple mechanism required for conveying the recording sheet and the original can be provided.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
   a main body forming an outer surface of said facsimile apparatus;
   a recording unit, which adopts serial recording type ink-jet recording means, and being arranged in said main body;
   an original reader arranged in an upper portion of said recording unit;
   an original insertion port for an original, which is formed in an upper surface of said main body;
   a sheet insertion port for a recording sheet, which is formed in the upper surface of said main body;
   an original discharge port for the original, which is formed in a front surface of said main body;
   a sheet discharge port for the recording sheet, which is formed in a lower portion of the front surface of said main body;
   an original convey path for conveying the original from said original insertion port formed in an upper surface of said main body to said original discharge port formed in the front surface of said main body through said original reader; and
   a recording sheet convey path for conveying the recording sheet from said sheet insertion port formed in an upper surface of said main body to said sheet discharge port formed in the lower portion of the front surface of said main body through said recording unit, wherein both said recording sheet convey path and said original convey path are arranged to slant from the upper surface to the front surface of said main body, and wherein both original and recording sheets are inserted from said original insertion port, and said sheet insertion port, respectively, and are discharged from said original discharge port, and said sheet discharge port, respectively.

2. The apparatus according to claim 1, wherein an externally operable operation unit is arranged above said recording unit, and near a front edge portion of said main body.

3. The apparatus according to claim 1, wherein a portion of said recording sheet convey path is arranged to be inclined from the upper surface toward the front surface of said main body, and said recording sheet convey path is almost horizontally arranged from an intermediate portion thereof toward said sheet discharge port.

4. The apparatus according to claim 1, wherein a portion of said recording sheet convey path is arranged to be inclined from the upper surface toward the front surface of said main body, and a portion of an upstream portion of said recording sheet convey path is arranged to store a plurality of recording sheets and to be detachable from said main body, and can supply the recording sheets one by one toward said recording unit.

5. The apparatus according to claim 1, wherein a second recording sheet convey path almost horizontally supplies the recording sheets, one by one, from a rear surface insertion port, formed in a rear surface of said main body, toward said recording unit.

6. The apparatus according to claim 1, further comprising reverse means for conveying upward the recording sheet inserted from a lower recording sheet insertion port formed below said sheet discharge port, reversing the recording sheet forward, and discharging the recording sheet from said recording sheet discharge port outside said main body, so that the recording sheet is conveyed from the lower recording sheet insertion port to said recording unit.

7. A facsimile apparatus comprising:
   a main body forming an outer surface of said facsimile apparatus;
   a recording unit, which adopts serial recording type ink-jet recording means, and being arranged in said main body;
   an original reader arranged in an upper portion of said recording unit;
   an original insertion port for an original, which is formed in an upper surface of said main body;
   a sheet insertion port for a recording sheet, which is formed in the upper surface of said main body;
   an original discharge port for an original, which is formed in a front surface of said main body;
   a sheet discharge port for a recording sheet, which is formed in the front surface of said main body;
   an original convey path for conveying the original from said original insertion port formed in an upper surface of said main body to said original discharge port formed in a front surface of said main body through said original reader;
   said original convey path is arranged to slant from the upper surface to the front surface of said main body;
   a recording sheet convey path for conveying the recording sheet from said sheet insertion port to said sheet discharge port through said recording unit,
   a portion of said recording sheet conveying path being inclined from the upper surface toward the front surface of said main body, both originals and recording sheets are inserted from said original insertion port and said sheet insertion port respectively, and are discharged from said original discharge port and said sheet discharge port respectively; and
   a lid, one end of which is axially supported and which is located at an intermediate portion of said recording sheet convey path, said lid closing said sheet insertion port and said original insertion port, and supporting a portion of the original when said lid is set in an upright state.

8. A facsimile apparatus comprising:
   a main body forming an outer surface of said facsimile apparatus;
   a recording unit, which provides a replaceable ink cartridge to a serial recording type ink-jet recording means, and is arranged in a portion behind a front surface of said main body;
   a front surface lid, which is openably arranged on the front surface of said main body, and allows replacement of the ink cartridge;
   an original reader arranged in an upper portion of said recording unit;
   an original insertion port for an original, which port is formed in an upper surface of said main body;
   a sheet insertion port for a recording sheet, which port is formed in the upper surface of said main body;
   an original discharge port for an original, which port is formed in a front surface of said main body;

a sheet discharge port for the recording sheet, which port is formed in the lower portion of the front surface of said main body;

an original convey path for conveying the original from said original insertion port formed in an upper surface of said main body to said original discharge port formed in a front surface of said main body through said original reader; and a recording sheet convey path for conveying the recording sheet from said sheet insertion port formed in an upper surface of said main body to said sheet discharge port formed in the lower portion of the front surface of said main body through said recording unit, wherein both said recording sheet convey path and said original convey path are arranged to slant from the upper surface to the front surface of said main body, both original and recording sheet are inserted from said original insertion port, and said sheet insertion port, respectively, and are discharged from said original discharge port, and said sheet discharge port, respectively.

9. The apparatus according to claim 8, further comprising a lid, one end of which is axially supported, which is located at a lower portion of said sheet discharge port, and which can be selectively set in a state for supporting the recording sheet discharged from said sheet discharge port, and in a state wherein said lid is held to extend along said front surface lid.

10. The apparatus according to claim 8, wherein a heavy power supply unit and control unit are arranged in a lower portion of said main body.

11. The apparatus according to claim 8, wherein said original reader comprises a contact type original reading device which has a low profile along a convey direction of the original.

12. The apparatus according to claim 8, wherein a portion of said recording sheet convey path is arranged to be inclined from the upper surface toward the front surface of said main body, and said recording sheet convey path is almost horizontally arranged from an intermediate portion thereof toward said sheet discharge port.

13. The apparatus according to claim 8, wherein a portion of said recording sheet convey path is inclined from the upper surface toward the front surface of said main body, a lid, one end of which is axially supported and which is located at an intermediate portion of said recording sheet convey path, is arranged, and said lid closes between and upon said sheet insertion port and said original insertion port, and supports a portion of the original when said lid is set in an upright state.

14. The apparatus according to claim 8, wherein a portion of said recording sheet convey path is arranged to be inclined from the upper surface toward the front surface of said main body, and a portion of an upstream portion of said recording sheet convey path is arranged to store a plurality of recording sheets and to be detachable from said main body, and can supply the recording sheets one by one toward said recording unit.

15. The apparatus according to claim 8, wherein a second recording sheet convey path almost horizontally supplies the recording sheets, one by one, from a rear surface insertion port, formed in a rear surface of said main body, toward said recording unit.

16. The apparatus according to claim 8, further comprising reverse means for conveying the recording sheet from a lower recording sheet insertion port formed below said sheet discharge port to said recording unit, reversing the recording sheet upward, and discharging the recording sheet from said recording sheet discharge port outside said main body.

17. The apparatus according to claim 8, further comprising an original width regulating section, which is arranged midway along said original convey path, and is adjusted in correspondence with a width of the original.

18. A facsimile apparatus comprising:

a main body forming an outer surface of said facsimile apparatus;

a serial recording unit arranged in said main body;

an original reader arranged in an upper portion of said serial recording unit;

an original insertion port for an original, which is formed in an upper surface of said main body;

a sheet insertion port for a recording cut sheet, which is formed in the upper surface of said main body;

an original discharge port for the original, which is formed in a front surface of said main body;

a sheet discharge port for the recording cut sheet, which is formed in the lower portion of the front surface of said main body;

an original convey path for conveying the original from said original insertion port formed in the upper surface of said main body to said original discharge port formed in the front surface of said main body through said original reader; and a recording sheet convey path for conveying the recording cut sheet from said sheet insertion port formed in an upper surface of said main body to said sheet discharge port formed in the lower portion of a front surface of said main body through said recording unit, wherein both said recording sheet convey path and said original convey path are arranged to slant from the upper surface to the front surface of said main body, both originals and recording sheets are inserted from said original insertion port, and said sheet insertion port, respectively, and are discharged from said original discharge port, and said sheet discharged port, respectively.

* * * * *